United States Patent [19]

Jensen

[11] Patent Number: 5,646,969
[45] Date of Patent: Jul. 8, 1997

[54] APPARATUS FOR INSTALLING TIE ROD ASSEMBLY IN SPACE BETWEEN JET PUMP ASSEMBLIES WITH LIMITED VERTICAL ACCESS

[75] Inventor: Grant Clark Jensen, Morgan Hill, Calif.

[73] Assignee: General Electric Company, San Jose, Calif.

[21] Appl. No.: 532,184

[22] Filed: Sep. 22, 1995

[51] Int. Cl.$^6$ .................................................. G21C 19/00
[52] U.S. Cl. .......................... 376/260; 193/42; 414/146; 269/1; 254/93 R
[58] Field of Search .......................... 376/260, 463; 414/146; 193/42, 35 R; 269/1, 289 MR; 254/93 R

[56] References Cited

U.S. PATENT DOCUMENTS

| | | | |
|---|---|---|---|
| 939,452 | 11/1909 | Stocking | 193/42 |
| 1,845,312 | 2/1932 | McEwen | 193/42 |
| 4,436,692 | 3/1984 | Stenabaugh | 376/260 |
| 4,645,071 | 2/1987 | Faulkner et al. | 193/37 |
| 4,783,053 | 11/1988 | Virmiyahu et al. | 254/93 R |
| 5,044,061 | 9/1991 | Kramer | 29/447 |

Primary Examiner—Daniel D. Wasil
Attorney, Agent, or Firm—James E. McGinness

[57] ABSTRACT

A tool for protecting a boiling water reactor component against damage by a shroud repair assembly suspended from a cable and lowered into the downcomer annulus. The tool has a roller with an outer surface made of a material which will not scratch the surface of a tie rod of the shroud repair assembly as the latter is lowered relative to the roller. The tool has sets of opposing grippers made of aluminum alloy which are pressed against opposing surfaces of the shroud and the reactor pressure vessel with sufficient force to clamp the tool in the annulus. The pressing force is generated by air-actuated cylinders which are actuated remotely. In one embodiment, the roller is fixed and acts as a stop to limit tangential travel of the suspended assembly. In another embodiment, the roller is displaceable in a tangential direction in response to remote actuation of a pair of air-actuated positioning cylinders. The roller is displaced to push the contacting portion of the shroud repair assembly in a tangential direction, e.g., to a position where the suspended assembly will avoid a reactor component upon further lowering of the assembly.

19 Claims, 11 Drawing Sheets

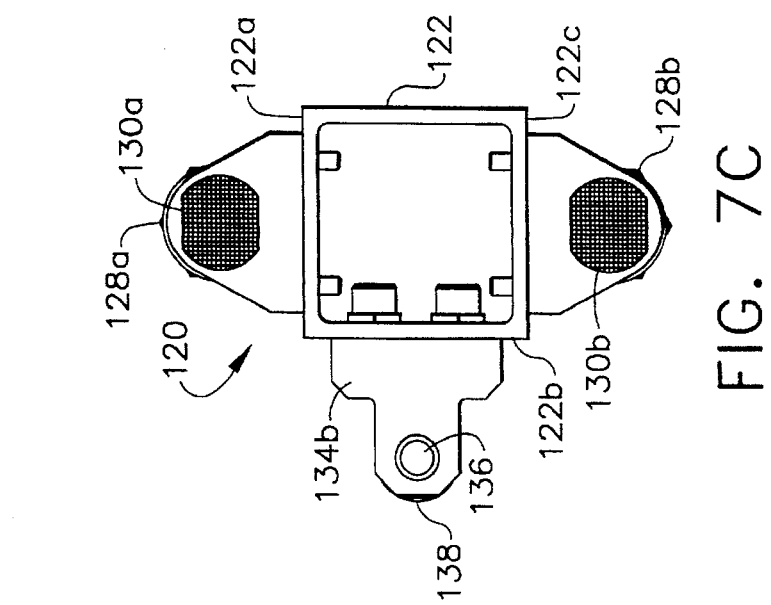
FIG. 7C
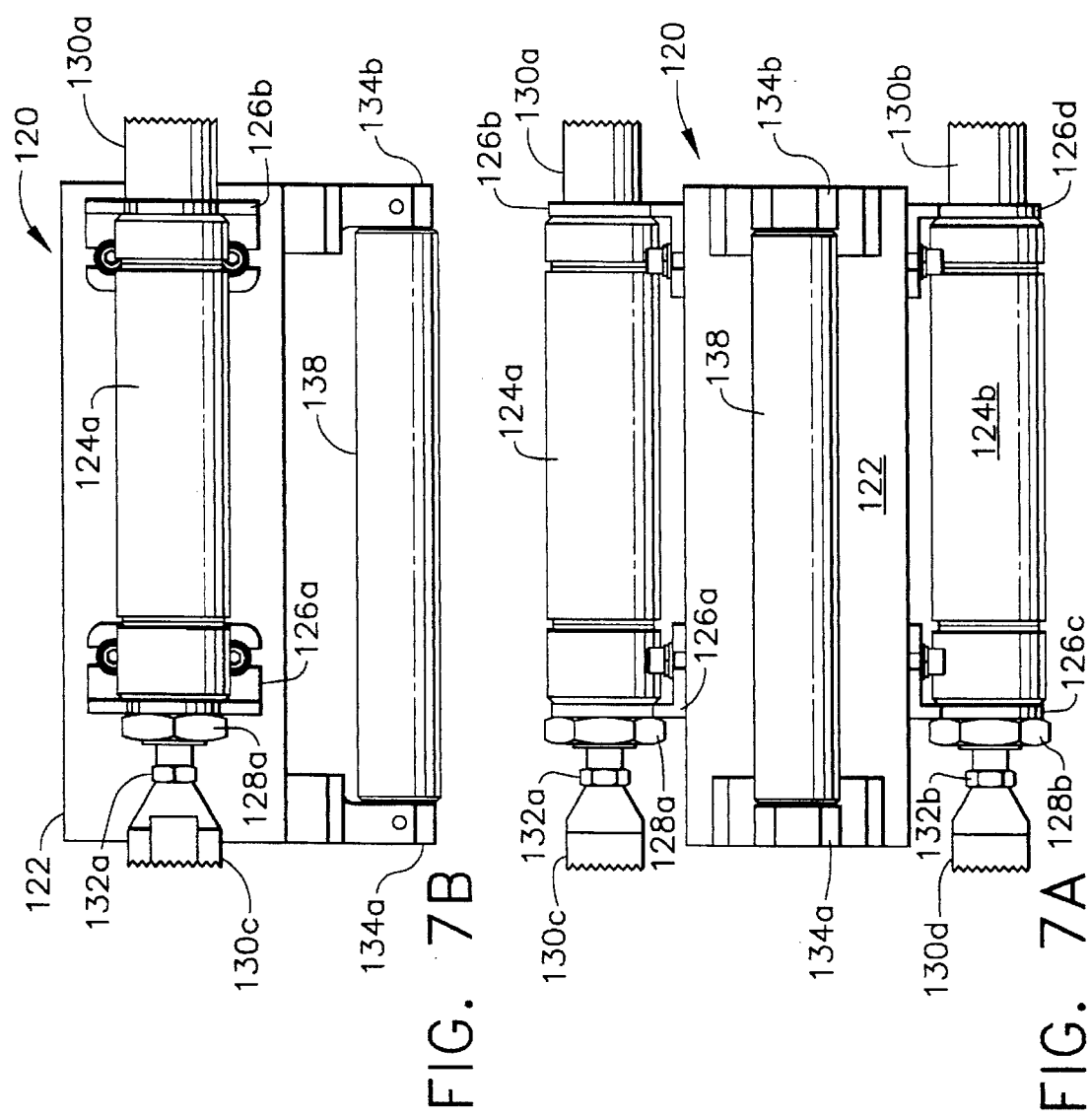
FIG. 7B
FIG. 7A

APPARATUS FOR INSTALLING TIE ROD ASSEMBLY IN SPACE BETWEEN JET PUMP ASSEMBLIES WITH LIMITED VERTICAL ACCESS

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

A conventional boiling water reactor (BWR) is shown in FIG. 1. Feedwater is admitted into a reactor pressure vessel 10 via a feedwater inlet 12 and a feedwater sparger 14, which is a ring-shaped pipe having suitable apertures for circumferentially distributing the feedwater inside the reactor pressure vessel (RPV). The feedwater from sparget 14 flows downwardly through the downcomer annulus 16, which is an annular region between RPV 10 and core shroud 18. In addition, a core spray inlet 11 supplies water to a core spray sparger 13 (located inside the shroud 18) via core spray header 15, core spray downcomer piping 17 and core spray elbow 19 (which penetrates the shroud wall). The core spray header 15 has a circular section that occupies space directly underneath feedwater sparger 14.

Core shroud 18 is a stainless steel cylinder surrounding the nuclear fuel core. The core is made up of a plurality of fuel bundle assemblies 22 (only two 2×2 arrays of which are shown in FIG. 1). Each array of fuel bundle assemblies is supported at the top by a top guide 20 and at the bottom by a core plate 21. The core top guide 20 provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical standpipes 30 atop shroud head 28 are in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is conducted from the RPV via steam outlet 38.

The BWR also includes a coolant recirculation system which provides the forced convection flow through the core necessary to attain the required power density. A portion of the water is pumped from the lower end of the downcomer annulus 16 via recirculation water outlet 42 and forced by a centrifugal recirculation pump (not shown) into jet pump assemblies 44 (only one of which is shown) via recirculation water inlets 46. The BWR has two recirculation pumps, each of which provides the driving flow for a plurality of jet pump assemblies. The jet pump assemblies are circumferentially distributed around the core shroud 18.

The core shroud 18 (shown in more detail in FIG. 2) in one type of BWR comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports the core top guide 20 and the shroud head 28. In particular, a cracked shroud increases the risks posed by a loss-of-coolant accident (LOCA). During a LOCA, the loss of coolant from RPV 10 produces a loss of pressure above the shroud head 28 and an increase in pressure inside the shroud 18, i.e., underneath shroud head 28. The result is an increased lifting force on shroud head 28 and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A repair method for vertically restraining a weakened core shroud utilizes tensioned tie rods 54 coupled to the shroud flange 18a and to the shroud support plate 52, as seen in FIG. 2. The lower end of the tie rod/lower spring assembly hooks underneath a clevis pin 60 inserted in a hole machined into gusset plate 58, which plate is in turn welded to shroud support plate 52 and RPV 10. In addition, the shroud 18 is restrained laterally by installation of wishbone springs 56a/56b and 72, which are components of the shroud repair assembly.

Referring to FIG. 2, the shroud restraint tie rod/lower spring assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The lower spring 56 has a slotted end which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly 62 which hangs on the shroud flange 18a. A pair of notches or slots are machined in the shroud head ring 28a of shroud head 28. The notches are positioned in alignment with a pair of bolted upper support plate segments 64 of upper support assembly 62 when the shroud head 28 is properly seated on the top surface of shroud flange 18a. These notches facilitate coupling of the tie rod/lower spring assembly to the shroud flange.

The pair of notches at each tie rod azimuthal position receive respective hook portions 64a of the upper support plates 64. Each hook 64a conforms to the shape of the top surface of shroud flange 18a and the shape of the steam dam 29. The distal end of hook 64a hooks on the inner circumference of shroud dam 29.

The upper support plates 64 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded tensioning nut 70 is screwed onto the upper threaded portion 54a (see FIG. 4) of tie rod 54.

As seen in FIG. 2, the assembly comprised of support plates 64 with hooks 64a, support block 66, tie rod 54, lower spring 56, clevis pin 60 and gusset plate 58 form a vertical load path by which the shroud flange 18a is connected to the shroud support plate 52. In the tensioned state, the upper support plates 64 exert a restraining force on the top surface of shroud flange 18a which opposes separation of the shroud 18 at any assumed failed circumferential weld location.

Lateral restraint at the elevation of the top guide support ring 18c is provided by an upper spring 72 having a double cantilever "wishbone" design. The end of the radially outer arm of upper spring 72 has an upper contact spacer 74 rotatably mounted thereon which bears against the inner surface of the wall of RPV 10.

A spring arm 56a of lower spring 56 laterally supports the shroud 18 at the core plate support ring 18g, against the vessel 10, via a lower contact spacer 76. The top end of spring arm 56a has a threaded bore to provide the attachment for the threaded bottom end 54b (see FIG. 4) of tie rod 54. The member 56d connecting the upper wishbone spring 56a, 56b to clevis hook 56c is offset from the line of action between the lower end of tie rod 54 and clevis pin 60 to provide a vertical spring compliance in the load path to the tie rod. A middle support 80 is preloaded against the vessel wall at assembly by radial interference which bends the tie rod 54, thereby providing improved resistance to vibratory excitation failure of the tie rod.

During installation of the shroud repair hardware shown in FIG. 2, the tie rod/lower spring assembly comprising tie rod 54 screwed into lower spring 56 is suspended from a cable and lowered into the annulus to the desired elevation. Only after clevis hook 56c has been hooked under clevis pin 60 and the tie rod/lower spring assembly has been braced in the hooked position will the upper support assembly 62 be installed, followed by upper spring 72.

As the cable is lowered, the tie rod/lower spring assembly must be guided into the narrow space between adjacent jet pump assemblies. However, in some BWRs this installation site lies below the feedwater sparger, core spray header and core spray downcomer piping, which lie in the path of a descending tie rod suspended from an overhead crane. To protect the feedwater sparger and core spray header from damage due to impact by the descending tie rod/lower spring assembly, which weighs in excess of 1,000 pounds, a cover is hooked onto the feedwater sparger to deflect the tie rod away from the feedwater sparger and core spray header. In addition, steps need to be taken to avoid damaging the core spray downcomer piping and the jet pump sensing lines during maneuvering of the tie rod/lower spring assembly.

SUMMARY OF THE INVENTION

The present invention is a tool comprising a roller for protecting a reactor component against damage by a heavy assembly, e.g., a tie rod/lower spring assembly, suspended from a cable and lowered into the downcomer annulus of a BWR. The outer surface of the roller is preferably made of a material which will not scratch the surface of the tie rod as the latter is lowered relative to the roller. The tool has sets of opposing grippers made of aluminum alloy which are pressed against opposing surfaces of the shroud and the reactor pressure vessel with sufficient force to clamp the tool in the annulus. The pressing force is generated by air-actuated cylinders which are actuated remotely after the tool has been correctly positioned by remote manipulation using service poles or any other conventional positioning equipment.

In accordance with one preferred embodiment, the roller is fixed and acts as a stop to limit travel of the suspended assembly. In particular, the stop blocks the suspended assembly from contact with the reactor component to be protected.

In accordance with another preferred embodiment, the roller is displaceable and acts as a manipulator. When the manipulator is installed in the downcomer annulus, the roller is displaceable in a tangential direction from a first position to a second position in response to remote actuation of a pair of air-actuated positioning cylinders. The roller is maintained in the first position until the assembly has been lowered into contact with or in proximity to the roller. Then the cylinders are actuated to displace the roller, thus pushing the contacting portion of the assembly in a tangential direction, e.g., to a position whereat the assembly will avoid a reactor component to be protected upon further lowering of the assembly.

In accordance with the preferred embodiment of the manipulator, the roller is mounted on a shaft supported at opposing ends by respective bearings. The bearings are mounted on the distal ends of the pistons of respective air-actuated positioning cylinders which are mounted in parallel on opposing sides of a support frame for the manipulator. After the suspended assembly has been lowered into contact with the roller, the pistons of the positioning cylinders are extended in tandem with equal strokes, causing the roller to translate in a generally tangential direction. The translated roller pushes the contacting portion of the assembly tangentially. As the suspended assembly is lowered further under the influence of gravity by unwinding the cable, the roller rotates due to its contact with the lowering assembly, thereby maintaining the assembly so that it does not slide against or otherwise contact the jet pump assembly.

BRIEF DESCRIPTION OF THE DRAWINGS

FIGS. 7A–7C are front, top and end views, respectively, of a tie rod stop in accordance with one preferred embodiment of the invention.

DETAILED DESCRIPTION OF THE PREFERRED EMBODIMENTS

Figure 1:
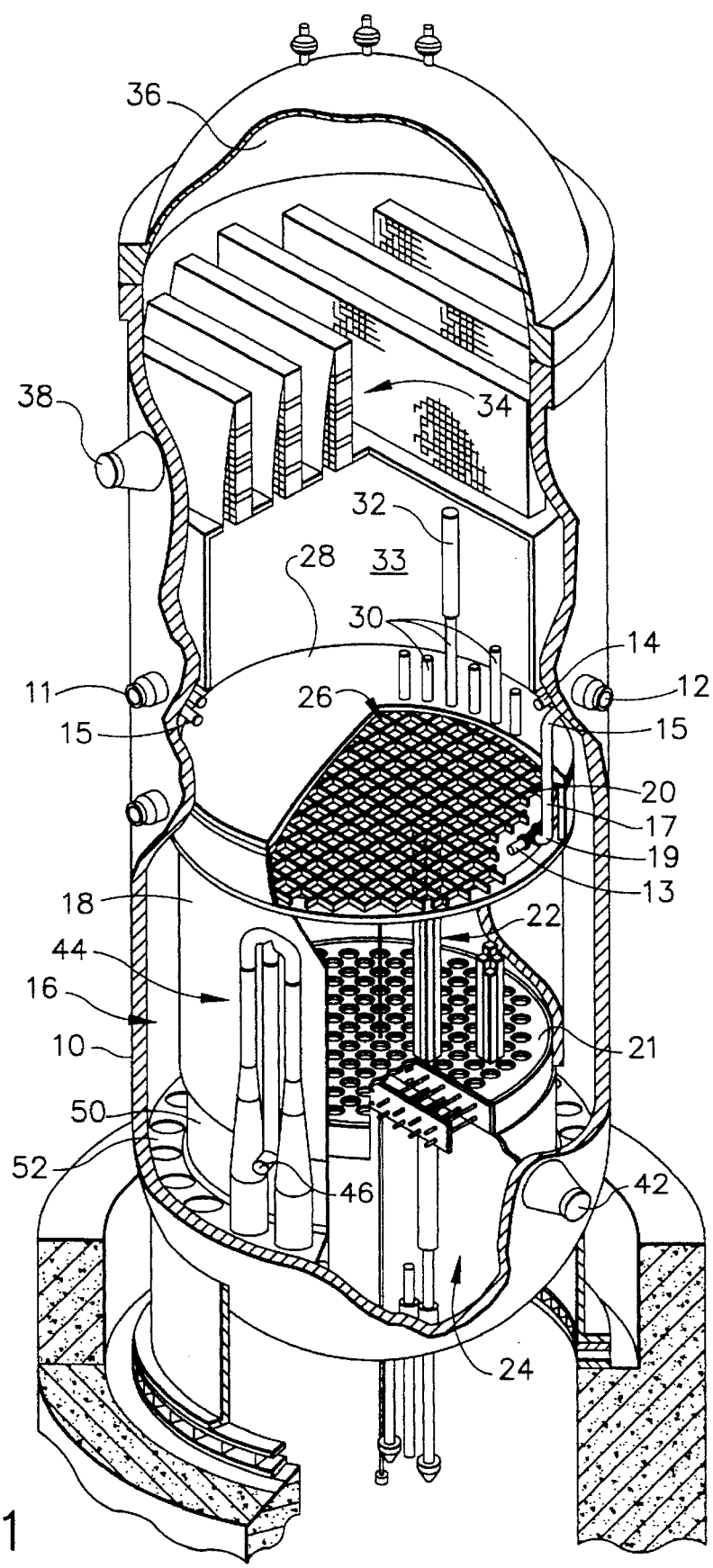
FIG. 1 is a schematic showing a partially cutaway isometric view of a conventional BWR.
Figure 2:
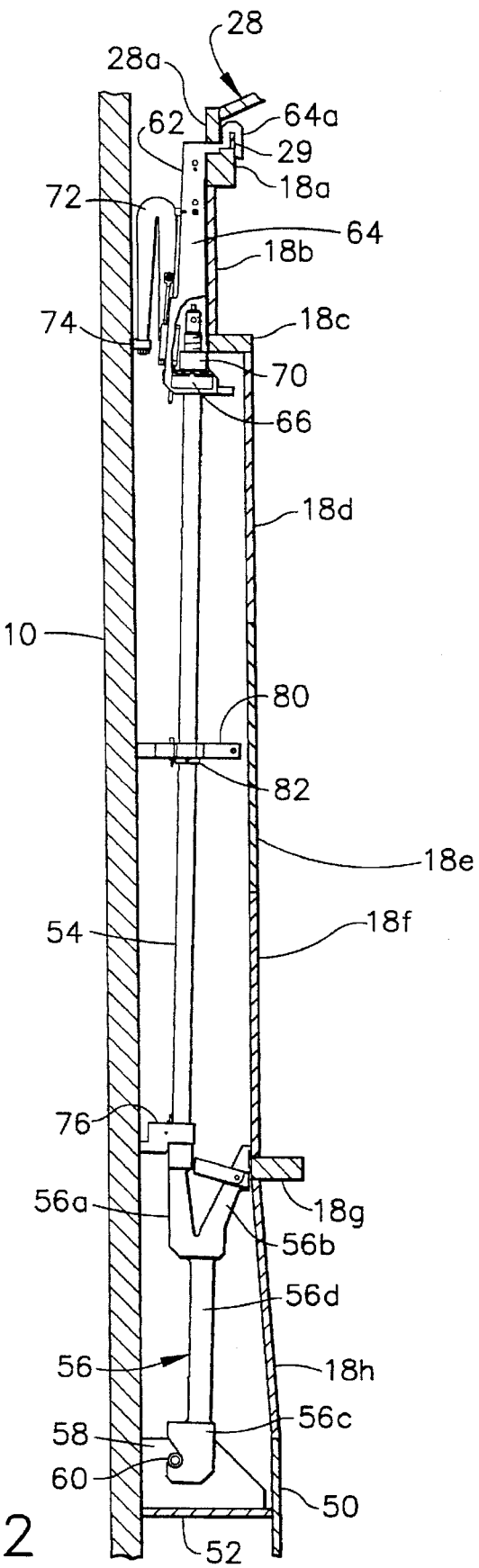
FIG. 2 is a sectional elevational view of core shroud repair hardware comprising a tie rod/lower spring assembly for vertically restraining the shroud and wishbone springs for laterally restraining the shroud at the elevations of the top guide support ring and the core plate.

During the installation procedure, the tie rod/lower spring assembly (items 54 and 56 in FIG. 2) is lowered into the downcomer annulus 16. This is accomplished using a crane (not shown) on the refueling floor of the reactor. First, the tie rod/lower spring assembly must be raised from horizontal position on the refueling floor to a vertical position suspended from the end of the crane cable. This is accomplished by means of a tie rod adaptor which couples the upper end of the tie rod to the end of the cable. When the cable is wound, the upper end of the tie rod is lifted off the refueling floor into an upright position with all of the weight of the tie rod being supported by the cable. The tie rod/lower spring assembly can then be lowered into the annulus by unwinding the cable.

Figure 3A:
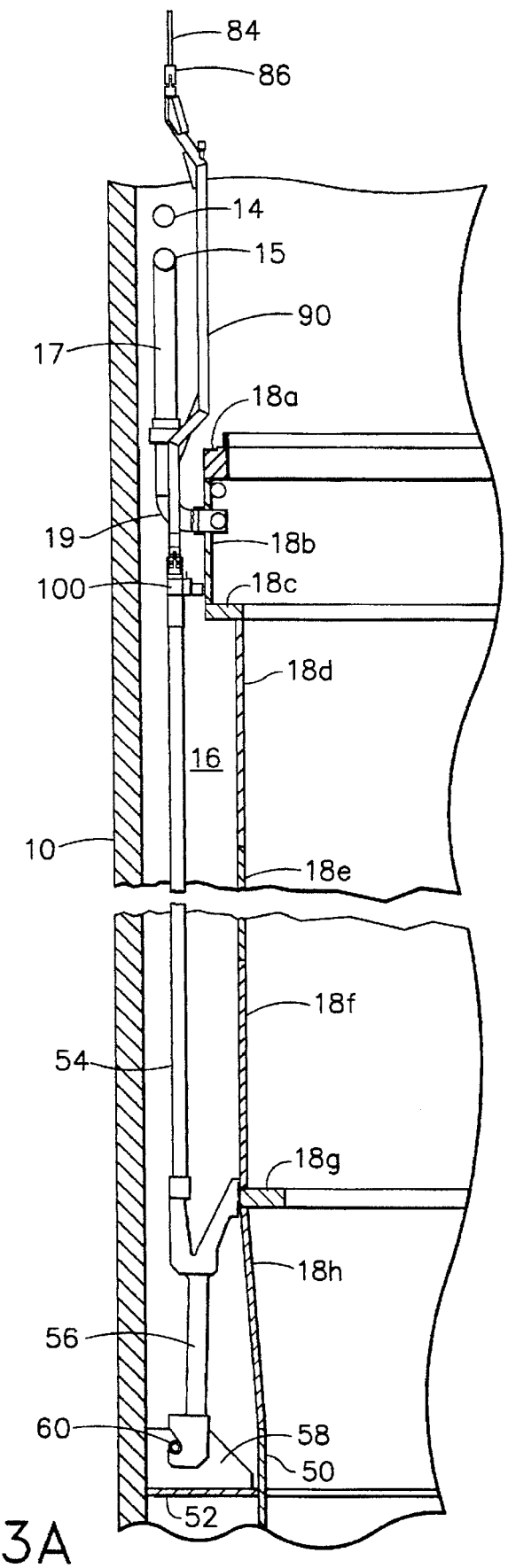
FIG. 3A is a sectional elevational view showing the position and configuration of the strongback assembly of the invention relative to the feedwater sparger and core spray header of a typical BWR.
Figure 3B:
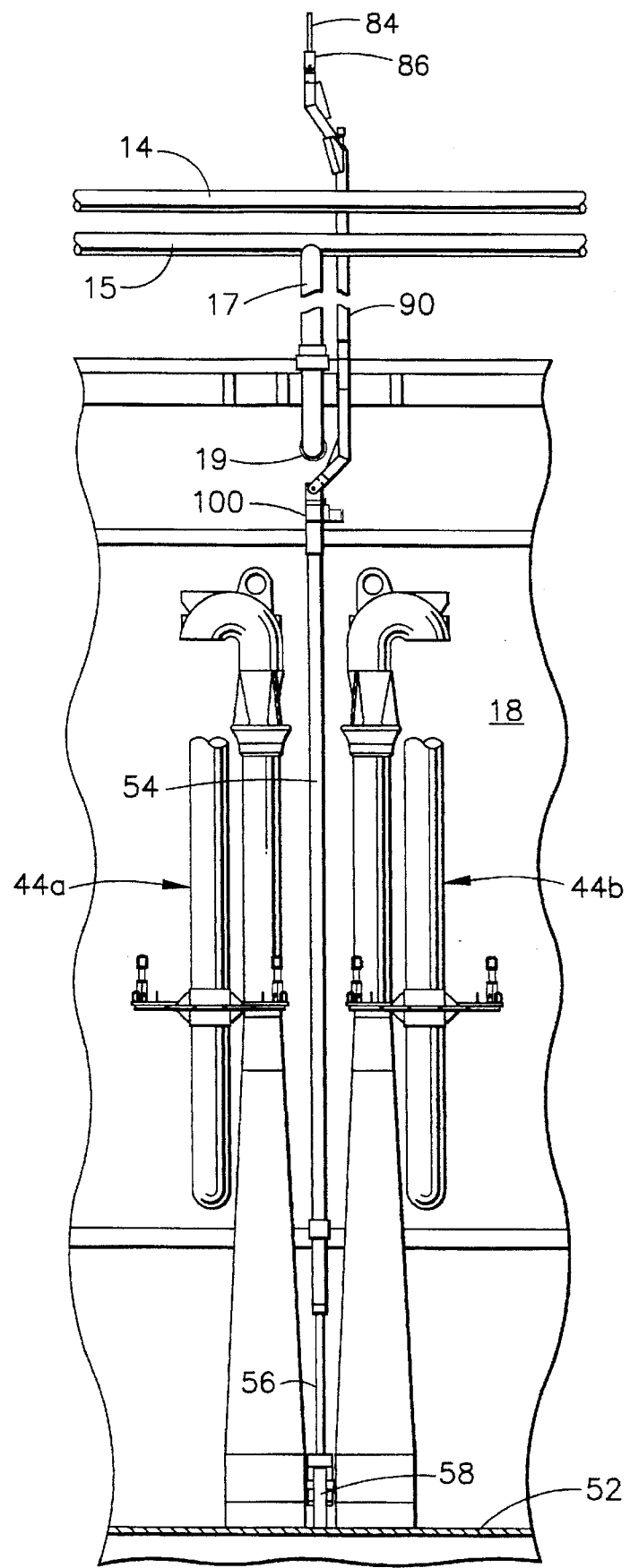
FIG. 3B is a radial elevational view showing the position and configuration of the strongback assembly of the invention relative to the jet pump assemblies and the core spray downcomer piping of a typical BWR.

Referring to FIGS. 3A and 3B, when vertical access to the downcomer annulus 16 is limited by internal reactor structures such as the feedwater sparger 14 and core spray header 15, the tie rod adaptor 100 is coupled to the end of the cable 84 via a rigid frame or strongback 90 specially designed to bypass the obstruction.

Figure 5A:
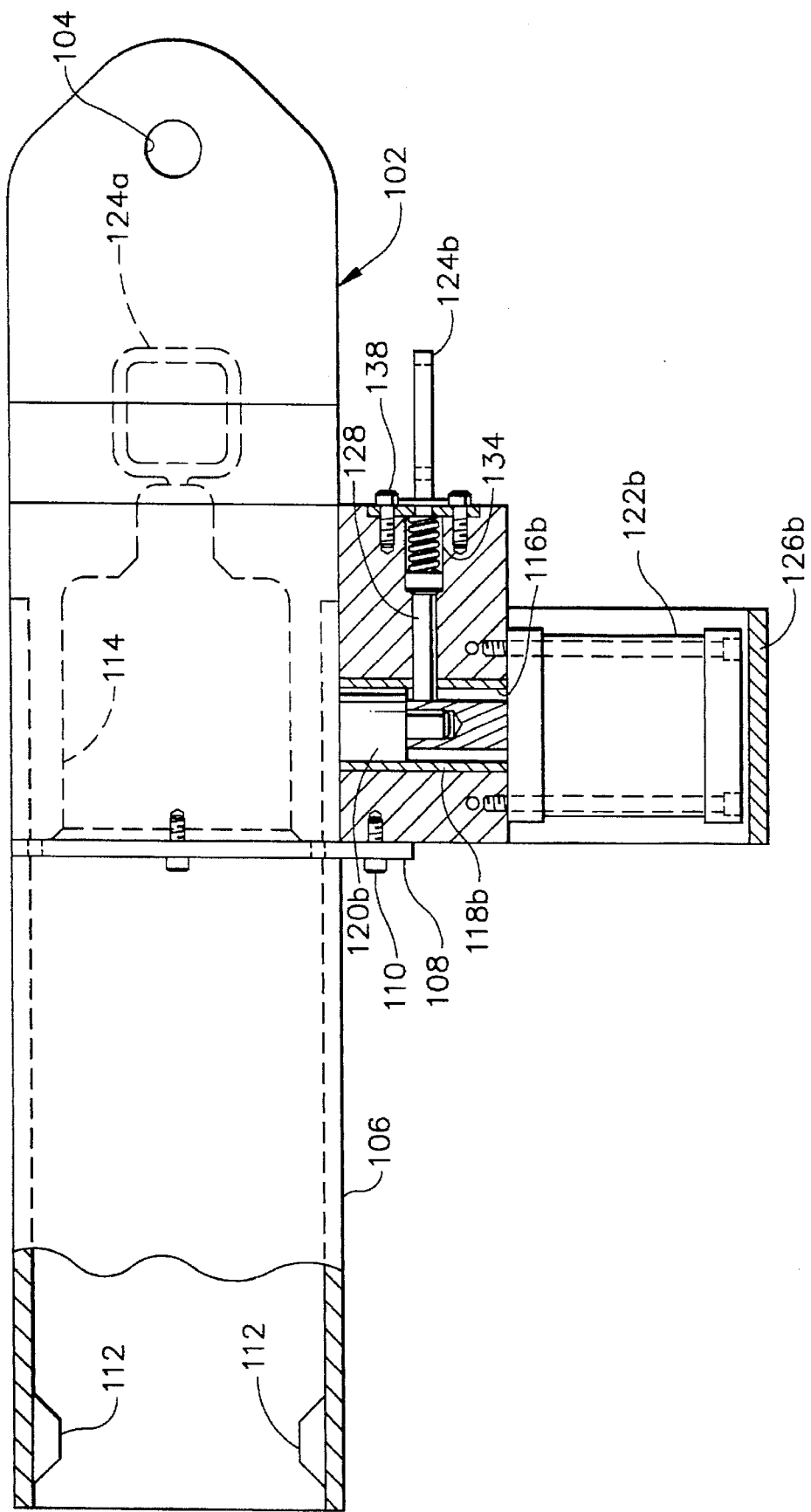
FIGS. 5A and 5B are partly sectioned elevation and plan views of a tie rod adaptor used in conjunction with the strongback of the present invention and the tie rod of FIG. 4.
Figure 5B:
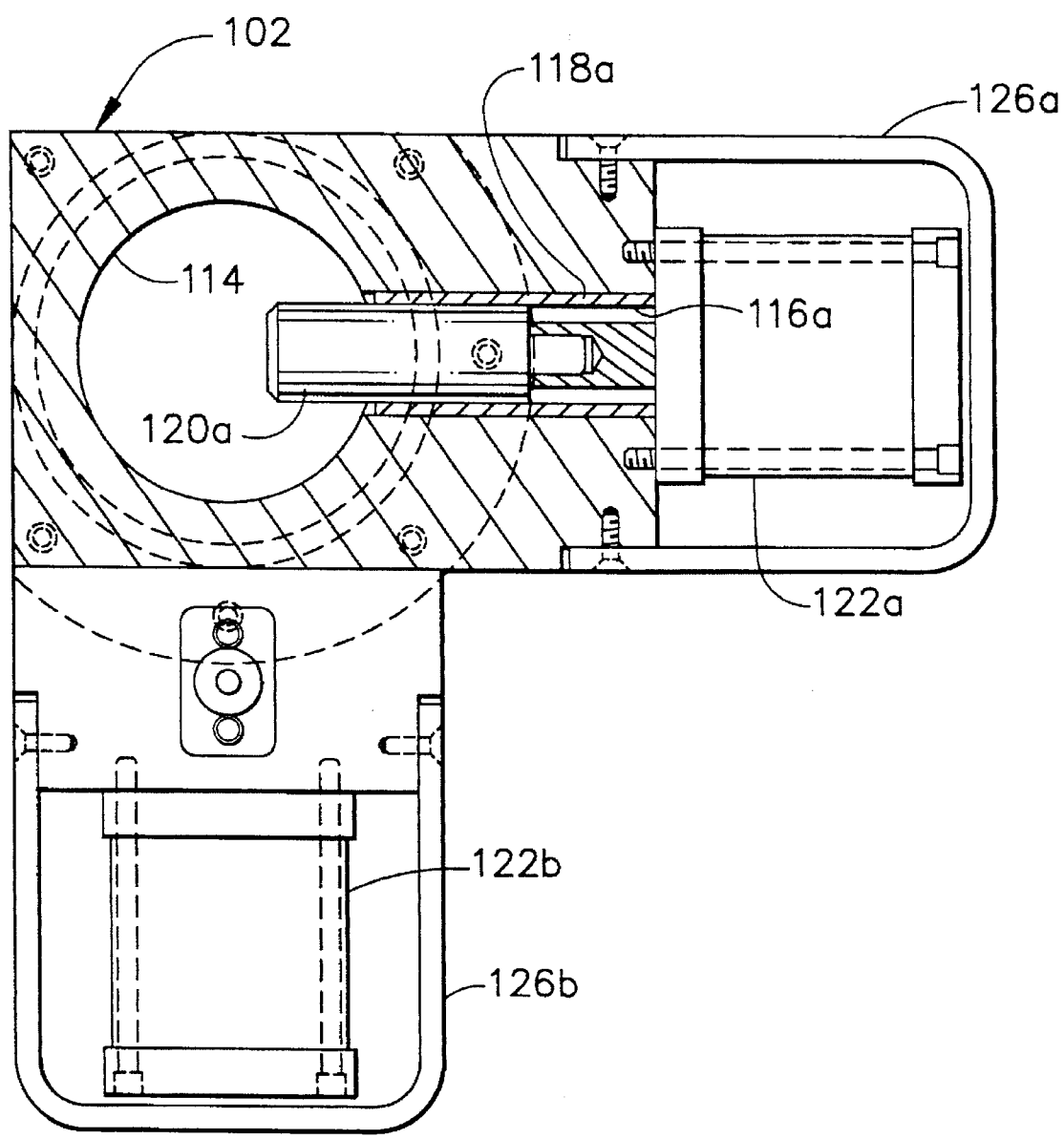

Referring to FIGS. 5A and 5B, the tie rod adaptor 100 comprises a frame 102 having a hole 104 for receiving a conventional coupling mechanism, such as a clevis pin, which must be strong enough to bear the entire weight of the tie rod/lower spring assembly. A circular cylindrical shield 106 for protecting the threads of the tie rod is connected to the frame 102 by means of a mounting plate 108.

The frame 102 has an axial recess 114 shaped for receiving the upper end of the tie rod, and a pair of circular cylindrical holes 116a and 116b which communicate with axial recess 114. Each hole 116a and 116b has a respective bushing 118a and 118b in which a respective locking pin 120a and 120b is slidably mounted. Each locking pin is slidable from a first position whereat the locking pin does not interfere with axial recess 114 to a second position whereat the locking pin interferes with axial recess 114, as seen in FIG. 5B. Each locking pin 120a, 120b slides from the interfering position to the non-interfering position in response to actuation of a respective pneumatic cylinder 122a, 122b. The piston of pneumatic cylinder 122a is connected to a reduced-diameter end of locking pin 120a; the piston of pneumatic cylinder 122b is connected to a reduced-diameter end of locking pin 120b. As best seen in FIG. 5B, each cylinder is protected against damage by a respective U-shaped cylinder shield 126a, 126b attached to frame 102 via screws.

Figure 4:
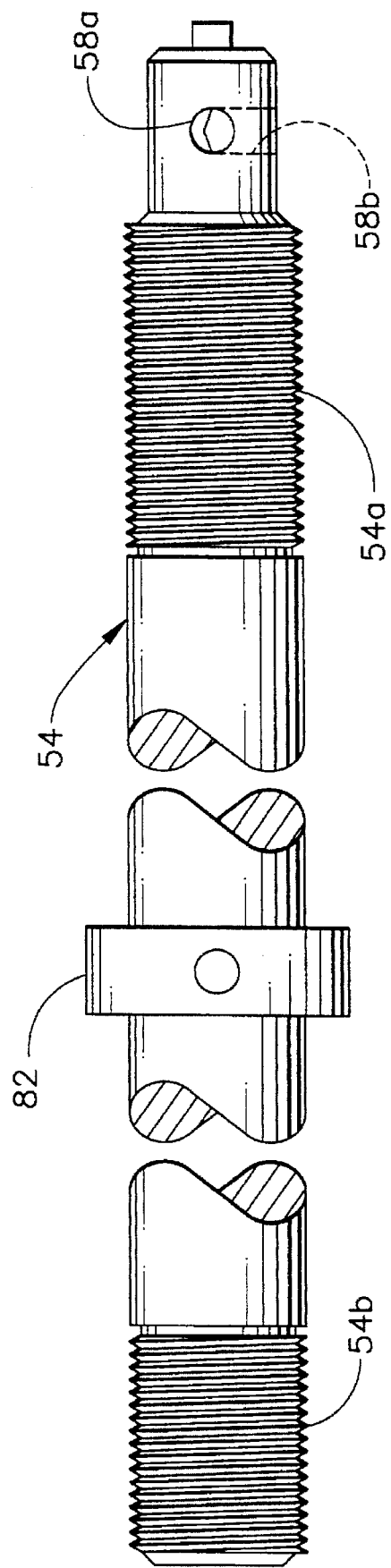
FIG. 4 is an elevation view of the upper end of the tie rod incorporated in the shroud repair assembly shown in FIG. 2.

Each locking pin 120a and 120b is disposed radially relative to the axis of the tie rod and is configured to fit with little play inside a respective one of circular cylindrical radial holes 58a and 58b formed in the topmost portion of the tie rod upper end, as shown in FIG. 4, and inside a respective one of the bushings 118a and 118b. In the preferred embodiment, the holes 58a and 58b are mutually perpendicular, as are the locking pins 120a and 120b. Each locking pin is capable of supporting the entire weight of the tie rod, which is in excess of 1,000 pounds.

Each pneumatic cylinder is connected to a separate source of pressurized fluid via a respective pneumatic line (not shown). Each piston is retracted when pressurized fluid, e.g., air, is supplied to the cylinder and extended when the supply of pressurized fluid is cut off. When the pistons are extended, they interlock the adaptor to the tie rod via locking pins 120a and 120b which extend into tie rod holes 58a and 58b (see FIG. 4) respectively. Each cylinder has a spring return which urges the locking pins to engage tie rod holes 58a and 58b when pneumatic pressure is discontinued. As a safeguard to prevent dropping the tie rod into the annulus, each locking pin is latched in the locking position by a respective latch 128. The exposed end of each latch shaft is integrally joined with a respective eyebolt 124a and 124b. The tie rod cannot be disengaged from the lifting apparatus until each latch 128 has been manually unlatched by an operator using a handling pole to lift the eyebolts. Then pressurized fluid can be supplied to disengage the locking pins 120a and 120b from the holes in the tie rod. When both locking pins are retracted, the tie rod lifting apparatus can be disengaged from the tie rod and removed from the annulus.

The hole 104 of tie rod adaptor 100 is coupled by a first clevis pin (not shown) to an apertured clevis 90a (see FIGS. 6A and 6B) which forms the lower end of the strongback 90. The upper end of strongback 90, in turn, has an apertured clevis 90h which is coupled by a second clevis pin (also not shown) to a cable 84 by a cable adaptor 86 (see FIGS. 3A and 3B). The strongback must have a height sufficient to span the distance between a point above the feedwater sparger 14 to a point below the core spray elbow 19, thereby allowing a shorter cable to be used. Because the cable ends at a point above and the strongback circumvents the piping obstructions, the tie rod/lower spring assembly 54/56 can be freely suspended without the supporting hardware or cable bearing against the piping. Thus, the cable stays plumb and the position of the tie rod/lower spring assembly relative to the gusset plate 58 can be freely adjusted by displacing the cable adaptor, e.g., by displacing the crane or by exerting a lateral force on the cable.

Figure 6A:
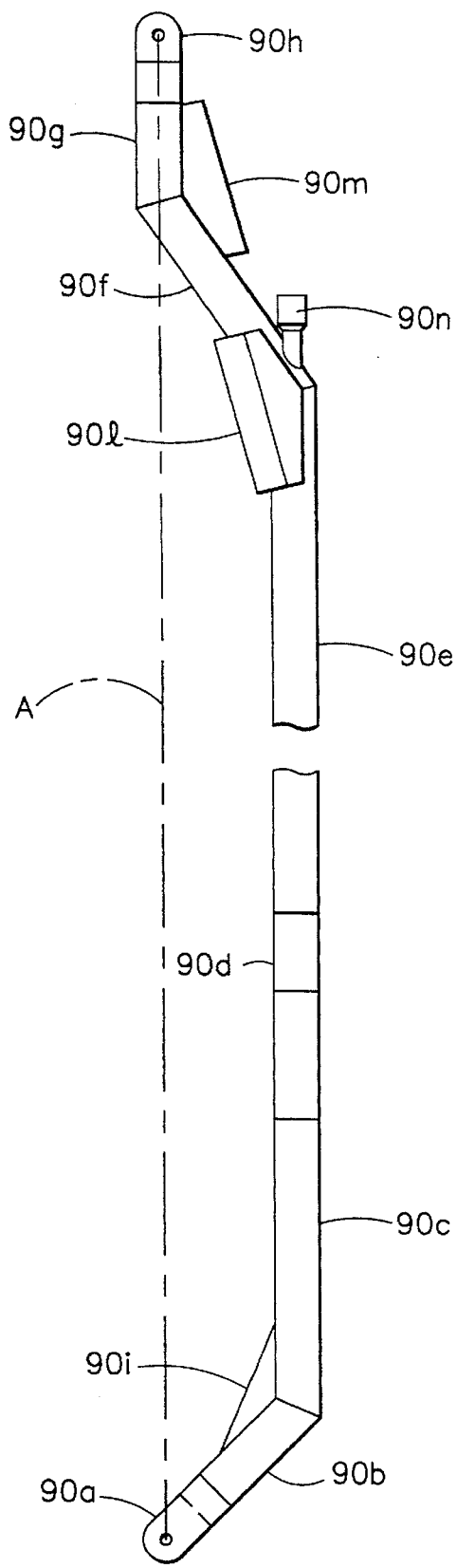
FIGS. 6A and 6B are elevation views of the strongback assembly in accordance with the preferred embodiment of the invention, the view in FIG. 6A being rotated 90° relative to the view in FIG. 6B.
Figure 6B:
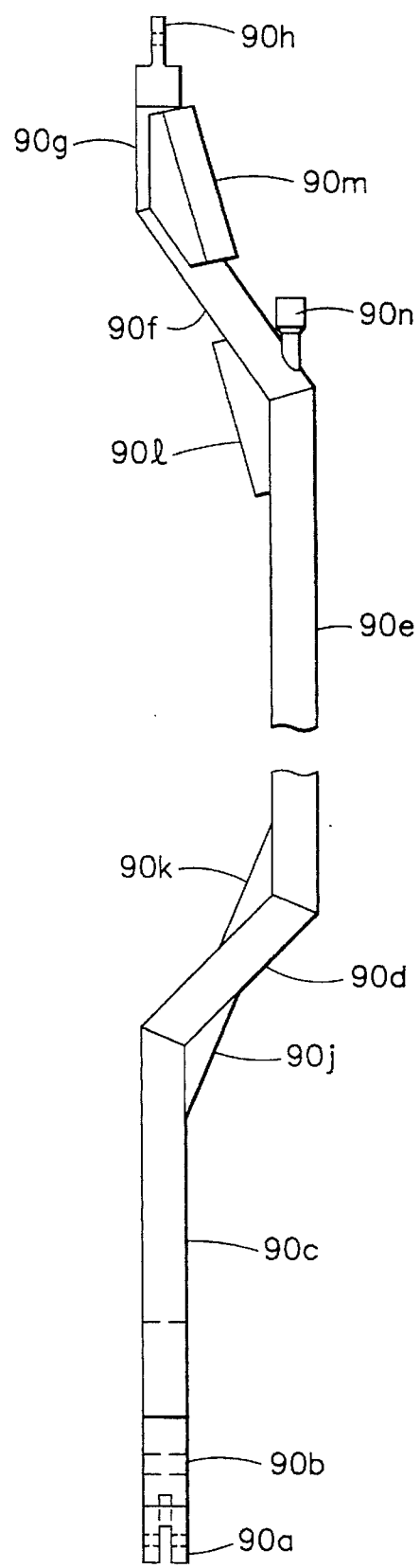

As shown in FIGS. 6A and 6B, the strongback is a welded assembly of rigid linear tubes 90b–90g of square cross section. The tubes 90c and 90e are parallel to and offset from the reference axis A and offset from each other (see FIG. 6A). Tubes 90c and 90e define a midsection plane which is offset from reference axis A. Each of the welded joints connecting an oblique tube to a vertical tube is reinforced by a respective channel welded to both rigid linear members and spanning the welded joint. These reinforcing ribs bear the designations 90*i*–90*m* in FIGS. 6A and 6B. Finally, a coupling 90*n* is attached to oblique tube 90*f* such that the axis of a hexagonal socket in the head of the coupling is generally vertical and accessible from above by a tool which can be manipulated remotely to cause the strongback 90 to rotate about reference axis A during positioning of the tie rod/lower spring assembly relative to the gusset plate.

Figure 9:
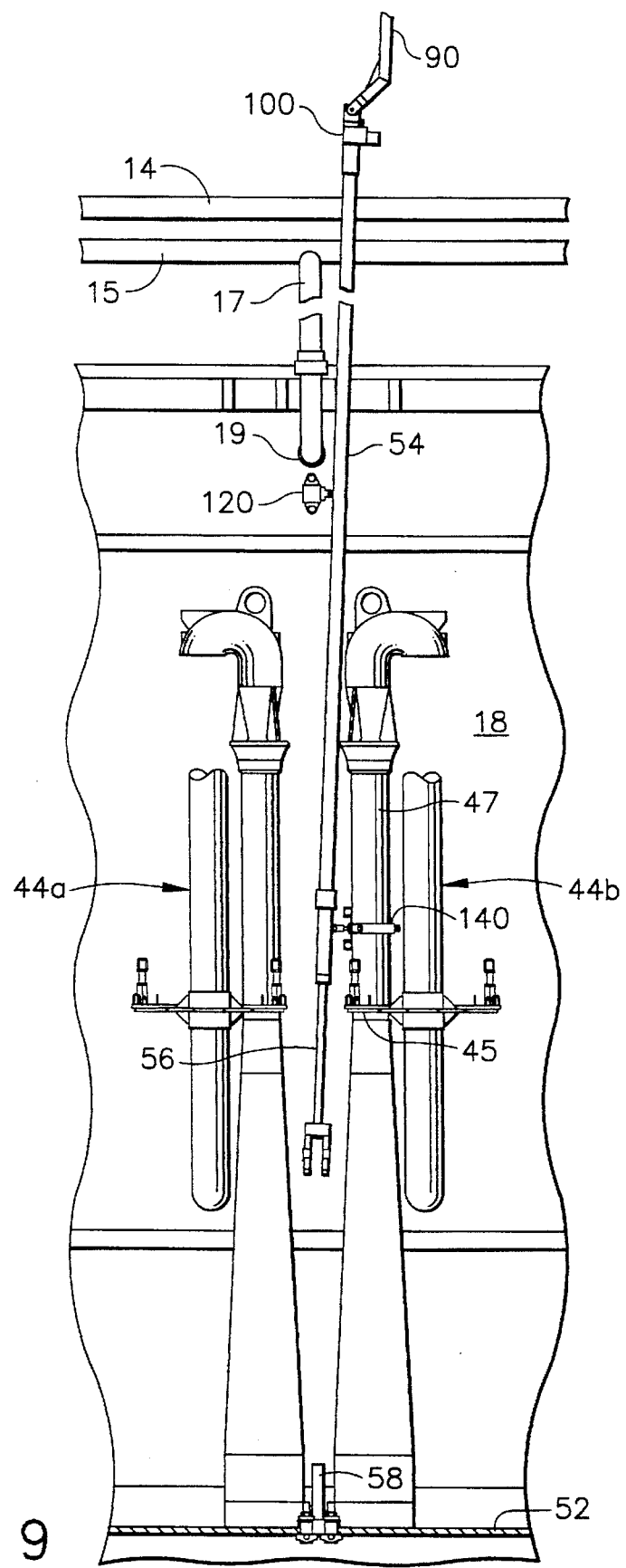
FIG. 9 is a radial elevational view showing the positioning of a tie rod stop and a tie rod manipulator in accordance with the tie rod installation procedure of the present invention.

Maneuvering of the tie rod/lower spring assembly must be done with extreme care to avoid damaging reactor hardware such as the core spray downcomer piping, the jet pump restrainer brackets and the jet pump sensing lines. This is accomplished in accordance with the present invention by installing a tie rod stop 120 in the downcomer annulus at a location below the core spray elbow 19 and by installing a tie rod manipulator 140 in the downcomer annulus at a location above the restrainer bracket 45 and around an inlet mixer 47 of a jet pump assembly 44*b* (as shown in FIG. 9). The tie rod stop 120 has a fixed roller which is located such that it blocks the tie rod 54 from moving tangentially into contact with the core spray elbow 19. The tie rod manipulator 140 has a displaceable roller which can be pneumatically actuated to push the tie rod 54 tangentially away from the jet pump assembly 44*b*.

The structure of tie rod stop 120 is shown in detail in FIGS. 7A–7C. Tie rod stop 120 comprises a square tube 122 made of aluminum alloy. A pair of air-actuated clamping cylinders 124*a* and 124*b* are mounted on opposite faces 122*a* and 122*c*, respectively, of tube 122 by means of mounting brackets 126*a*, 126*b* and 126*c*, 126*d*, respectively. In an exemplary embodiment, these clamping cylinders are double-acting cylinders having a 5-inch stroke. Clamping cylinders 124*a* and 124*b* have one end secured to mounting brackets 126*a* and 126*c*, respectively, by mounting nuts 128*a* and 128*b*. The other ends of clamping cylinders 124*a* and 124*b*, which are respectively supported by mounting brackets 126*b* and 126*d*, have respective grippers 130*a* and 130*b* affixed thereto. Grippers 130*a* and 130*b* protrude beyond the extent of tube 122 and are not movable relative thereto. The piston of each clamping cylinder has a respective gripper 130*c*, 130*d* coupled thereto by a respective jam nut 132*a*, 132*b*. When tool 120 is oriented radially in the downcomer annulus at a desired elevation with the clamping cylinders 124*a* and 124*b* vertically aligned, the clamping cylinders are actuated to extend their respective pistons in parallel. The extended pistons force grippers 130*a* and 130*b* into abutment with the outer peripheral surface of the core shroud and grippers 130*c* and 130*d* into abutment with the inner peripheral surface of the reactor pressure vessel. The resulting frictional forces between the knurled surfaces of the grippers the shroud and RPV surfaces hold the tool securely in place.

The third face 122*b* of tube 122 has a pair of end block 134*a*, 134*b* mounted at opposing ends thereof. The end blocks 134*a*, 134*b* support the ends of a stainless roller pin 136. Roller pin 136 in turn supports a coaxial roller 138 which is loosely sleeved thereon. The roller is preferably made of ultra-high molecular weight polyethylene to prevent scratching of the tie rod as it bears against the roller surface during descent in the annulus.

Figure 8A:
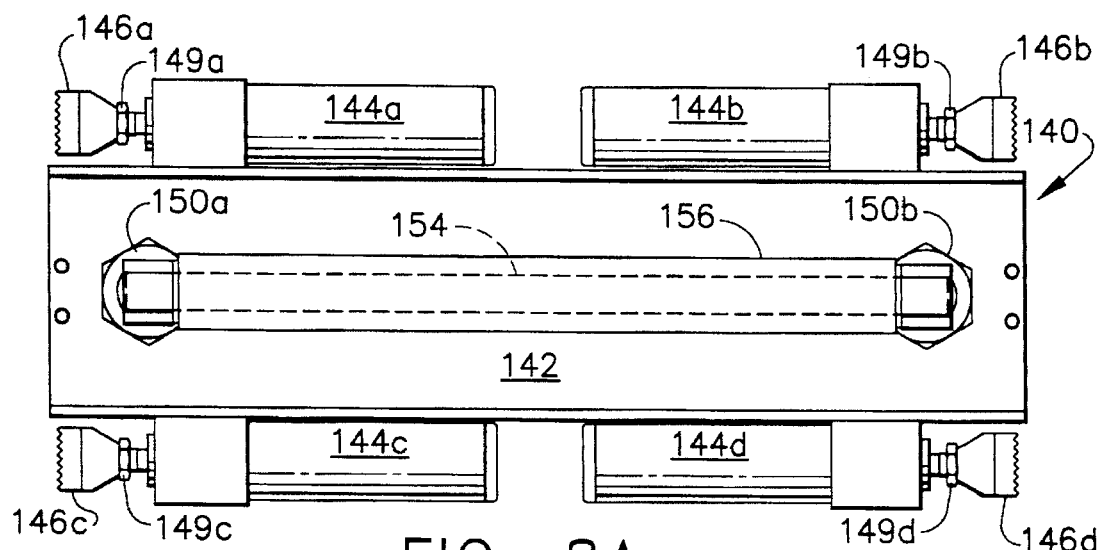
FIGS. 8A–8C are front, top and end views, respectively, of a tie rod manipulator in accordance with another preferred embodiment of the invention.
Figure 8B:
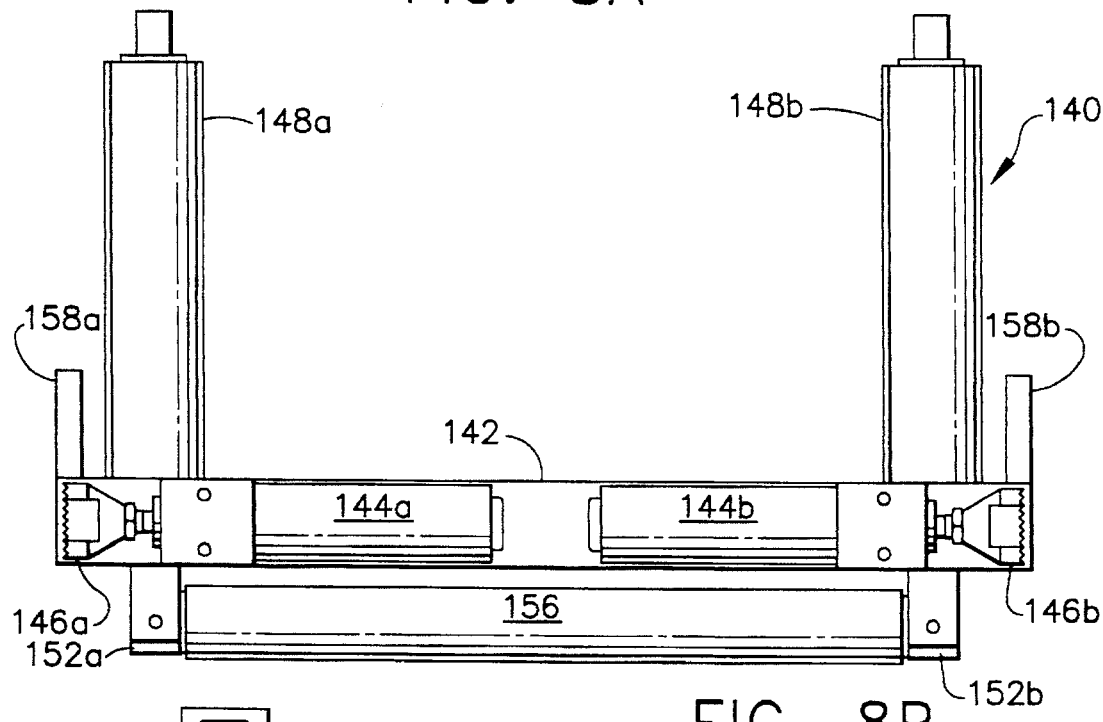
Figure 8C:
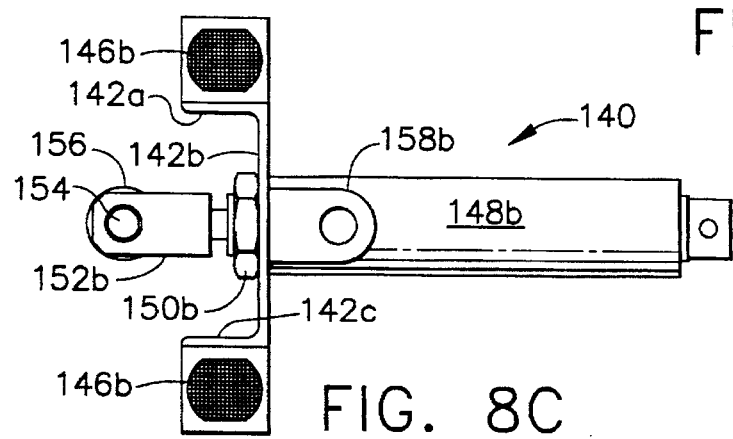

The structure of tie rod manipulator 140 is shown in detail in FIGS. 8A–8C. Tie rod manipulator 140 comprises a channel 142 made of aluminum alloy. Respective pairs of air-actuated clamping cylinders 144*a*, 144*b* and 144*c*, 144*d* are mounted on opposite arms 142*a* and 142*c*, respectively, of channel 142. Clamping cylinders 144*a* and 144*b* are mounted at opposite ends of channel arm 142*a*; clamping cylinders 144*c* and 144*d* are mounted at opposite ends of channel arm 142*b*. The piston of each clamping cylinder 144*a*–144*d* has a respective gripper 146*a*–146*d* coupled thereto by a respective jam nut 149*a*–149*d*. When tool 140 is oriented radially in the downcomer annulus at a desired elevation with clamping cylinders 144*a*, 144*b* vertically aligned with clamping cylinders 144*c*, 144*d*, respectively, the clamping cylinders are actuated to extend their respective pistons in parallel and opposite directions. The extended pistons urge grippers 146*a* and 146*c* into abutment with the outer peripheral surface of the core shroud and grippers 146*b* and 146*d* into abutment with the inner peripheral surface of the reactor pressure vessel with sufficient force to secure the tie rod manipulator in position.

The tie rod manipulator 140 further comprises a pair of air-actuated positioning cylinders 148*a* and 148*b* mounted on the base 142*b* of channel 142 by means of mounting nuts 150*a* and 150*b*. The positioning cylinders are separated by a distance greater than the outer diameter of the inlet mixer 47 around which the tie rod manipulator is placed. The piston of each positioning cylinder has an end block 152*a*, 152*b* mounted on the distal end thereof. The end blocks 152*a*, 152*b* support the ends of a stainless roller pin 154. Roller pin 154 in turn supports a coaxial roller 156 which is rotatably sleeved thereon. The roller 156 is preferably made of ultra-high molecular weight polyethylene to prevent scratching of the tie rod surface during tie rod descent in the annulus.

When the tie rod/lower spring assembly has been lowered so that the desired portion of the assembly is located at the elevation of the roller 156 of the tie rod manipulator 140 (see FIG. 9), positioning cylinders 148*a* and 148*b* are actuated to extend their respective pistons in parallel in a horizontal direction. The translated roller 156 pushes the abutting portion of the tie rod/lower spring assembly 54/56 tangentially by the amount of the cylinder stroke. In an exemplary embodiment of the tie rod manipulator, the positioning cylinders are double-acting cylinders having a 5-inch stroke, and the clamping cylinders are double-acting cylinders having a 3-inch stroke.

For the sake of convenience, the pneumatic lines which connect the clamping and positioning cylinders to a source of pressurized air via an air control station are not shown. Preferably, the positioning cylinders have a common pneumatic line to ensure that the positioning cylinders actuate in tandem.

The preferred embodiments of the tool in accordance with the present invention have been disclosed for the purpose of illustration. Variations and modifications of the disclosed structure which fall within the concept of this invention will be readily apparent to persons skilled in the art of tooling design. For example, it will be apparent that the supporting frame of the tie rod stop could be a channel, not a tube. All such variations and modifications are intended to be encompassed by the claims set forth hereinafter.

I claim:

1. A tool comprising:

a support frame;

a first fluid-actuated clamping cylinder mounted on said support frame and having a first piston which is translatable in a first direction in response to actuation of said first fluid-actuated clamping cylinder;

a first gripper mounted on a distal end of said first piston;

a second fluid-actuated clamping cylinder mounted on said support frame generally coaxial with said first fluid-actuated clamping cylinder and having a second piston which is translatable in a second direction in response to actuation of said second fluid-actuated clamping cylinder, said second direction being generally opposite to said first direction;

a second gripper mounted on a distal end of said second piston;

a roller support structure mounted on said support frame; and a roller rotatably mounted on said roller support structure, said roller having an axis of rotation which is generally parallel to said first direction.

2. The tool as defined in claim 1, wherein said roller is a sleeve made of plastic material.

3. The tool as defined in claim 2, wherein said plastic material is ultra-high molecular weight polyethylene.

4. The tool as defined in claim 1, further comprising a second gripper mounted on an end of said first fluid-actuated clamping cylinder which is remote from said distal end of said first piston.

5. The tool as defined in claim 1, wherein said roller support structure comprises a roller pin, said roller being loosely sleeved on said roller pin.

6. The tool as defined in claim 5, wherein said roller support structure further comprises a pair of end blocks mounted on said support frame, said roller pin being mounted in said end blocks.

7. The tool as defined in claim 1, wherein said first gripper has a knurled surface made of aluminum alloy.

8. A tool comprising:

a support frame;

a first fluid-actuated clamping cylinder mounted on said support frame and having a first piston which is translatable in a first direction in response to actuation of said first fluid-actuated clamping cylinder;

a first gripper mounted on a distal end of said first piston;

a roller support structure mounted on said support frame;

wherein said roller support structure comprises a roller pin, and first and second fluid-actuated positioning cylinders mounted on said support frame, said first and second fluid-actuated positioning cylinders respectively having first and second pistons which are translatable in unison in a second direction in response to simultaneous actuation of said first and second fluid-actuated positioning cylinders, said second direction being generally perpendicular to said first direction, wherein said roller pin is mounted on distal ends of said first and second pistons of said first and second fluid-actuated positioning cylinders; and a roller rotatably mounted on said roller pin, said roller having an axis of rotation which is generally parallel to said first direction.

9. A stop tool comprising:

a support frame having an axis;

a first fluid-actuated clamping cylinder mounted on said support frame and having a first piston which is translatable in a first direction in response to actuation of said first fluid-actuated clamping cylinder;

a first gripper mounted on a distal end of said first piston;

a second fluid-actuated clamping cylinder mounted on said support frame and having a second piston which is translatable in said first direction in response to actuation of said second fluid-actuated clamping cylinder;

a second gripper mounted on a distal end of said second piston;

a third gripper mounted on an end of said first fluid-actuated clamping cylinder which is remote from said distal end of said first piston;

a fourth gripper mounted on an end of said second fluid-actuated clamping cylinder which is remote from said distal end of said second piston;

a roller support structure mounted on said support frame; and a roller rotatably mounted on said roller support structure, said roller having an axis of rotation which is generally parallel to said first direction, wherein each of said first through fourth grippers has a non-smooth gripping surface, said non-smooth gripping surfaces of said first and second grippers being aligned at a first axial position when said first and second pistons are extended by the same distance and facing in said first direction, and said non-smooth gripping surfaces of said third and fourth grippers being aligned at a second axial position and facing in a second direction opposite to said first direction, said first and second axial positions being separated by a distance which is greater than a length of said roller and greater than a length of said support frame.

10. The stop tool as defined in claim 7, wherein said roller support structure comprises a roller pin, said roller being loosely sleeved on said roller pin.

11. The stop tool as defined in claim 7, wherein said roller is a sleeve made of plastic material.

12. The stop tool as defined in claim 10, wherein said plastic material is ultra-high molecular weight polyethylene.

13. The stop tool as defined in claim 9, wherein said roller support structure further comprises a pair of end blocks mounted on said support frame, said roller pin being mounted in said end blocks.

14. The stop tool as defined in claim 7, wherein each of said non-smooth gripping surfaces is a knurled surface made of aluminum alloy.

15. A positioning tool comprising:

a support frame having an axis;

first through fourth fluid-actuated clamping cylinders mounted on said support frame, said first and second clamping cylinders being coaxial with a first axis and having pistons which extend in opposite directions in response to actuation of said first and second clamping cylinders, said third and fourth clamping cylinders being coaxial with a second axis and having pistons which extend in opposite directions in response to actuation of said third and fourth clamping cylinders, said first axis being parallel to said second axis;

first through fourth grippers respectively mounted on a distal end of said pistons of said first through fourth clamping cylinders;

a roller support structure mounted on said support frame; and a roller rotatably mounted on said roller support structure, said roller having an axis of rotation which is generally parallel to a first direction, wherein each of said first through fourth grippers has a non-smooth gripping surface, said non-smooth gripping surfaces of said first and third grippers being aligned at a first axial position when said pistons of said first and third clamping cylinders are extended by the same distance and facing in said first direction, and said non-smooth gripping surfaces of said second and fourth grippers being aligned at a second axial position when said pistons of said second and fourth clamping cylinders are extended by the same distance and facing in a second direction opposite to said first direction, said first and second axial positions being separated by a distance which is greater than a length of said roller and greater than a length of said support frame.

16. The positioning tool as defined in claim 14, wherein said roller support structure comprises a roller pin, and said roller is a sleeve made of plastic material, said roller being loosely sleeved on said roller pin.

17. The positioning tool as defined in claim 15, wherein said plastic material is ultra-high molecular weight polyethylene.

18. The positioning tool as defined in claim 14, wherein each of said non-smooth gripping surfaces is a knurled surface made of aluminum alloy.

19. The positioning tool as defined in claim 15, wherein said roller support structure further comprises first and second fluid-actuated positioning cylinders mounted on said support frame, said first and second fluid-actuated positioning cylinders respectively having first and second pistons which are translatable in unison in a third direction in response to simultaneous actuation of said first and second fluid-actuated positioning cylinders, said third direction being generally perpendicular to said first direction, wherein said roller pin is mounted on distal ends of said first and second pistons of said first and second fluid-actuated positioning cylinders.

* * * * *